(12) United States Patent
Kim

(10) Patent No.: US 8,957,179 B2
(45) Date of Patent: Feb. 17, 2015

(54) SHAPE MEMORY POLYAMIDE AND METHOD OF PRODUCING SHAPE MEMORY POLYAMIDE FABRIC USING THE SAME

(71) Applicant: Hyosung Corporation, Seoul (KR)

(72) Inventor: Chang Woo Kim, Anyang-si (KR)

(73) Assignee: Hyosung Corporation, Seoul (KR)

( * ) Notice: Subject to any disclaimer, the term of this patent is extended or adjusted under 35 U.S.C. 154(b) by 0 days.

(21) Appl. No.: 14/028,791

(22) Filed: Sep. 17, 2013

(65) Prior Publication Data
US 2014/0013522 A1 Jan. 16, 2014

Related U.S. Application Data

(62) Division of application No. 12/446,546, filed as application No. PCT/KR2007/006320 on Dec. 6, 2007, now abandoned.

(30) Foreign Application Priority Data

Dec. 20, 2006 (KR) .......................... 10-2006-0130793
Oct. 30, 2007 (KR) .......................... 10-2007-0109460

(51) Int. Cl.
```
C08G 69/08    (2006.01)
D06P 5/00     (2006.01)
C08G 69/26    (2006.01)
C08G 69/32    (2006.01)
C08G 69/36    (2006.01)
C08G 69/42    (2006.01)
D01F 6/80     (2006.01)
D03D 15/00    (2006.01)
D06P 3/24     (2006.01)
```

(52) U.S. Cl.
CPC .............. D06P 5/001 (2013.01); C08G 69/265 (2013.01); C08G 69/32 (2013.01); C08G 69/36 (2013.01); C08G 69/42 (2013.01); C08L 2201/12 (2013.01); D01F 6/80 (2013.01); D03D 15/00 (2013.01); D06P 3/24 (2013.01); D10B 2331/02 (2013.01); D10B 2401/046 (2013.01); D10B 2501/00 (2013.01); D10B 2501/02 (2013.01)
USPC ....... 528/310; 428/36.1; 428/190; 428/299.7; 428/365; 528/323

(58) Field of Classification Search
USPC .............. 428/36.1, 190, 299.7, 365, 97, 221; 528/310, 323, 288
See application file for complete search history.

(56) References Cited

U.S. PATENT DOCUMENTS

| | | | |
|---|---|---|---|
| 4,385,170 A | 5/1983 | Hirami et al. | |
| 4,579,762 A | 4/1986 | Ucci | |
| 5,422,420 A | 6/1995 | Shridharani | |
| 5,560,973 A * | 10/1996 | Hoyt et al. | ...................... 428/97 |
| 5,637,653 A | 6/1997 | Preston et al. | |
| 5,698,658 A | 12/1997 | Dujari et al. | |

FOREIGN PATENT DOCUMENTS

| | | |
|---|---|---|
| JP | 2-268630 | 11/1990 |
| JP | 2004-250556 | 9/2004 |
| KR | 10-1993-0013259 | 7/1993 |
| KR | 10-0220220 | 6/1999 |
| KR | 10-0225738 | 7/1999 |
| KR | 10-2005-0036100 | 4/2005 |

OTHER PUBLICATIONS

International Search Report of PCT/KR2007/006320, dated Mar. 19, 2008.
Written Opinion of the International Searching Authority of PCT/KR20087/006320, dated Mar. 19, 2008.

* cited by examiner

*Primary Examiner* — Gregory Listvoyb
(74) *Attorney, Agent, or Firm* — Hamre, Schumann, Mueller & Larson, P.C.

(57) ABSTRACT

Disclosed is a shape memory polyamide, produced by adding a polyvalent carboxylic acid and a polyvalent amine when polyamide is polymerized from e-caprolactam or hexamethylenediamine and adipic acid, and having an aromatic component which is introduced by one or more among the polyvalent carboxylic acid and the polyvalent amine and has a total amount ranging from 0.4 mol % to 10 mol % based on the amount of the raw material for polyamide. Also, a method of producing a shape memory polyamide fabric using the shape memory polyamide is provided. The polyamide fabric produced using the shape memory polyamide is a highly functional fabric which does not easily wrinkle and easily recovers its original shape even when wrinkled, and thus may be applied as material for various kinds of clothing.

3 Claims, No Drawings

SHAPE MEMORY POLYAMIDE AND METHOD OF PRODUCING SHAPE MEMORY POLYAMIDE FABRIC USING THE SAME

TECHNICAL FIELD

The present invention relates to a shape memory polyamide and a method of producing a shape memory polyamide fabric using the same, and more particularly, to a shape memory polyamide, which is characterized in that polyamide includes a predetermined proportion of an aromatic component in the main chain thereof to thus exhibit shape memory properties upon post-processing, and to a method of producing a shape memory polyamide fabric using the same.

BACKGROUND ART

Conventionally, polyamide fibers, having strength, wear resistance, and dyeability superior to other synthetic fibers, have been efficiently used in various fields. However, clothing manufactured using polyamide fabric is disadvantageous because it readily wrinkles and does not sufficiently recover its original shape after washing or when worn. The wrinkling of the clothing is affected by various structural factors, including the molecular shapes of polymer, the number of twists, the density and thickness of cloth, and the external environment, including temperature and humidity.

In order to prevent the polyamide fabric from wrinkling due to such various factors, useful resins processing methods, including acid or alkali treatment or shrink proofing, chemical treatment methods, including ageing or annealing, and physical methods including mix spinning. However, acid or alkali treatment undesirably incurs high damage to cloth, and mix spinning treatment with less wrinkling fibers leads to insufficient anti-wrinkle effects.

Accordingly, attempts to develop shape memory fibers, which do not generate deformation or wrinkling after washing and do not readily wrinkle during wearing, are being made these days. The shape memory fiber is characterized in that it does not easily wrinkle and easily recovers its original shape. Thus, even though the shape memory fiber wrinkles, it may manually spread flat to thus easily recover its original shape, and furthermore, exhibits high durability upon ironing or washing.

As shape memory cloth, Japanese Unexamined Patent Publication No. Sho. 61-252353 discloses a nonwoven fabric sheet composed of a shape memory resin fiber and a shape memory resin adhesive. However, because such a nonwoven fabric sheet is formed by bonding short fibers with an adhesive, it is thick and uneven and is liable to incur high production costs due to the use of the adhesive. Further, as the shape memory fiber, shape memory polyester or polyethyleneterephthalate fibers have been introduced, but shape memory polyamide fibers or fabrics have not yet been developed. Therefore, it is urgently required to develop a high-functionality polyamide fabric having shape memory properties and the advantages of polyamide fibers.

DISCLOSURE OF INVENTION

Technical Problem

Accordingly, the present invention has been devised keeping in mind the above problems occurring in the related art, and provides a shape memory polyamide, which exhibits shape memory properties and can thus be processed into a fabric which does not easily wrinkle and has high recovery force.

In addition, the present invention provides a method of producing a shape memory polyamide fabric, using a copolyamide having an aromatic compound introduced to the molecular chain thereof.

In addition, the present invention provides a shape memory polyamide fabric produced by the method of the present invention and clothing produced using the shape memory polyamide fabric.

Technical Solution

According to the present invention, a shape memory polyamide may be produced by adding a polyvalent carboxylic acid and a polyvalent amine when polyamide is polymerized using e-caprolactam or hexamthylenediamine and adipic acid as raw material thereof, and may have an aromatic component which is introduced by one or more among the polyvalent carboxylic acid and the polyvalent amine, and has a total amount ranging from 0.4 mol % to 10 mol % based on the amount of polyamide raw material.

According to the present invention, a method of producing a shape memory polyamide fabric may include adding a polyvalent carboxylic acid and a polyvalent amine when polyamide is polymerized, thus synthesizing a copolyamide having an aromatic component, the total amount of which ranges from 0.4 mol % to 10 mol % based on the amount of the raw material for polyamide, subjecting the copolyamide to weaving or knitting, thus producing a woven or knitted fabric, and subjecting the woven or knitted fabric to heat treatment under conditions of (1) below and then to dyeing under conditions of (2) below:

$$Tg+40°\ C. \leq Tx \leq Tm-20°\ C. \qquad (1)$$

$$Tg \leq Td \leq Tx \qquad (2)$$

wherein Tg is the glass transition temperature of a semi-aromatic copolyamide, Tx is the heat treatment temperature, Tm is the melting point of a copolyamide, and Td is the dyeing temperature.

According to the present invention, a shape memory polyamide fabric may be produced using the method of the present invention, and clothing may be produced using the shape memory polyamide fabric.

BEST MODE FOR CARRYING OUT THE INVENTION

Hereinafter, a detailed description will be given of the present invention.

According to the present invention, the shape memory polyamide is produced by adding a polyvalent carboxylic acid and a polyvalent amine when polyamide is polymerized from e-caprolactam or hexamethylenediamine and adipic acid, and has an aromatic component, which is introduced by one or more among the polyvalent carboxylic acid and the polyvalent amine and has a total amount ranging from 0.4 mol % to 10 mol % based on the amount of the raw material for polyamide.

The principle by which the shape memory polyamide according to the present invention realizes shape memory properties is not definitely established, but may be assumed as follows. Typically, polyamide fiber has a regular arrangement based on strong hydrogen bonding power, and thus does not impart elastic properties. However, the polyamide according to the present invention has an aromatic group, thus making it possible to decrease chain distortion and interaction in the main chain caused thereby, consequently exhibiting shape memory properties.

Specific examples of the polyamide fiber include, but are not limited to, nylon 6, nylon 66, and nylon 6/66 copolymer. Nylon 6 is polymerized from e-caprolactam, and nylon 66 is polymerized from hexamethylenediamine and adipic acid.

In the present invention, the aromatic component is preferably an aromatic component containing a sulfonic acid group. Specifically, when the sulfonic acid group is present in the aromatic component, the shape memory properties may be desirably shown by physical networking based on the strong ionic bond of the sulfonic acid group.

The aromatic component may be introduced by a combination of an aromatic polyvalent carboxylic acid and an aliphatic polyvalent amine, a combination of an aliphatic polyvalent carboxylic acid and an aromatic polyvalent amine, or a combination of an aromatic polyvalent carboxylic acid and an aromatic polyvalent amine.

Examples of the polyvalent carboxylic acid usable in the present invention include, but are not limited to, adipic acid, sebacic acid, dodecanedicarboxylic acid, terephthalic acid, isophthalic acid, 1,3,5-tricarboxylic acid, 2,5- and 3,5-dicarboxybenzenesulfonic acid, 2,5- and 3,5-dicarboxyethylbenzenesulfonic acid, and 2,5- and 3,5-dicarboxypropylbenzenesulfonic acid or sulfonic acid salts of sodium, potassium or lithium thereof, 2,5- and 3,5-dimethoxyearboxylbenzenesulfonic acid, 2,5- and 3,5-dimethoxycarboxylethylbenzenesulfonic acid, and 2,5- and 3,5-dimethoxyearboxylpropylbenzenesulfonic acid or sulfonic acid salts of sodium, potassium or lithium thereof, 2,5- and 3,5-diethoxyearboxylethylbenzenesulfonic acid and 2,5- and 3,5-diethoxycarboxylpropylbenzenesulfonic acid or sulfonic acid salts of sodium, potassium or lithium thereof, 2,5- and 3,5-dipropoxycarboxylethylbenzenesulfonic acid and 2,5- and 3,5-dipropoxycarboxylpropylbenzenesulfonic acid or sulfonic acid salts of sodium, potassium or lithium thereof, and mixtures thereof.

The polyvalent amine compound may be selected from among ethylenediamine, tetramethylenediamine, hexamethylenediamine, octamethylenediamine, decamethylenediamine, undecamethylenediamine, dodecamethylenediamine, paraphenylenediamine, meta-phenylenediamine, para-xylenediamine, meta-xylenediamine, and mixtures thereof.

In addition, the present invention pertains to a method of producing a shape memory polyamide fabric. The method of producing the shape memory polyamide fabric according to the present invention includes introducing an aromatic group to the molecular chain of polyamide to thus synthesize a semi-aromatic copolyamide, subjecting the copolyamide prepolymer to melt spinning to produce yarn, and then subjecting the yarn to treatment according to the present invention to thus impart shape memory properties.

Specifically, in order to produce the shape memory polyamide fabric according to the present invention, first, a polyvalent carboxylic acid and a polyvalent amine are added when the polyamide is polymerized, thus synthesizing a copolyamide prepolymer having an aromatic component, the total amount of which ranges from 0.4 mol % to 10 mol % based on the amount of the raw material for the polyamide. As such, the raw material for nylon 6 includes e-caprolactam, and the raw material for nylon 66 includes adipic acid and hexamethylenediamine. Subsequently, the copolyamide prepolymer thus obtained is subjected to typical melt spinning to obtain yarn, which is then woven or knitted, thus producing a woven or knitted fabric. Finally, the woven or knitted fabric is subjected to heat treatment under conditions of (1) below to thus heat-set it, and then to dyeing under conditions of (2) below, thereby producing the shape memory polyamide fabric according to the present invention:

$$Tg+40° C. \leq Tx \leq Tm-20° C. \quad (1)$$

$$Tg \leq Td \leq Tx \quad (2)$$

wherein Tg is the glass transition temperature of the copolyamide prepolymer, Tx is the heat treatment temperature, Tm is the melting point of the copolyamide prepolymer, and Td is the dyeing temperature.

In the present invention, when the copolyamide prepolymer is synthesized from ε-caprolactam or adipic acid and hexamethylenediamine, the aromatic compound is added so that the amount of the aromatic component ranges from 0.4 mol % to 10 mol % based on the amount of the raw material for polyamide. When the amount of the aromatic compound is less than 0.4 mol %, the cloth that is finally obtained does not exhibit sufficient shape memory properties. On the other hand, when the amount of the aromatic compound exceeds 10 mol %, the degree of polymerization is drastically decreased, or the unique properties of the polyamide fabric disappear.

The aromatic compound used in the present invention may be selected from among a combination of an aromatic polyvalent carboxylic acid and an aliphatic polyvalent amine, a combination of an aliphatic polyvalent carboxylic acid and an aromatic polyvalent amine, and a combination of an aromatic polyvalent carboxylic acid and an aromatic polyvalent amine. In any case, the total amount of the aromatic compound must be equal to or lower than 10 mol % based on the amount of the raw material for polyamide in order to synthesize the copolyamide prepolymer.

The polyvalent carboxylic acid usable in the present invention may include, but is not limited to, one or more selected from among adipic acid, sebacic acid, dodecanedicarboxylic acid, terephthalic acid, isophthalic acid, 1,3,5-tricarboxylic acid, 2,5- and 3,5-dicarboxybenzenesulfonic acid, 2,5- and 3,5-dicarboxyethylbenzenesulfonic acid, and 2,5- and 3,5-dicarboxypropylbenzenesulfonic acid or sulfonic acid salts of sodium, potassium or lithium thereof, 2,5- and 3,5-dimethoxycarboxylbenzenesulfonic acid, 2,5- and 3,5-dimethoxycarboxylethy)benzenesulfonic acid, and 2,5- and 3,5-dimethoxycarboxylpropylbenzenesulfonic acid or sulfonic acid salts of sodium, potassium or lithium thereof, 2,5- and 3,5-diethoxycarboxylethylbenzenesulfonic acid and 2,5- and 3,5-diethoxycarboxylpropylbenzenesulfonic acid or sulfonic acid salts of sodium, potassium or lithium thereof, 2,5- and 3,5-dipropoxycarboxylethylbenzenesulfonic acid and 2,5- and 3,5-dipropoxyearboxylpropylbenzenesulfonic acid or sulfonic acid salts of sodium, potassium or lithium thereof, and mixtures thereof.

The polyvalent amine compound usable in the present invention may include, but is not limited to, one or more selected from among ethylenediamine, tetramethylenediamine, hexamethylenediamine, octamethylenediamine, decamethylenediamine, undecamethylenediamine, dodecamethylenediamine, para-phenylenediamine, metaphenylenediamine, para-xylenediamine, and meta-xylenediamine.

When the copolyamide prepolymer is synthesized according to the present invention, a dulling agent, for example, titanium dioxide, may be added to realize various degrees of gloss. Further, a magnesium compound, a copper compound, a manganese compound, or a zinc compound may be added to impart predetermined functionality.

The copolyamide prepolymer, in which the aromatic component is introduced to the polyamide chain, is subjected to typical melt spinning to thus produce the yarn, which is then woven or knitted, thus obtaining the woven or knitted fabric, after which the woven or knitted fabric is subjected to dry or wet heat treatment under conditions of (1) below to thus heat-set it, and then to dyeing at a temperature lower than the heat treatment temperature under conditions of (2) below, thereby imparting the woven or knitted fabric with shape memory properties:

$$Tg+40° C. \leq Tx \leq Tm-20° C. \quad (1)$$

$$Tg \leq Td \leq Tx \quad (2)$$

wherein Tg is the glass transition temperature of the copolyamide prepolymer, Tx is the heat treatment temperature, Tm is the melting point of the copolyamide prepolymer, and Td is the dyeing temperature.

In the present invention, in the case where the heat treatment temperature is lower than Tg+40° C. of the polyamide material, the heat setting properties of the woven or knitted fabric are deteriorated. On the other hand, if the heat treatment temperature is higher than Tm−20° C. of the material, partial melting of the material occurs undesirably.

The dyeing temperature is preferably lower than the heat treatment temperature. If the dyeing temperature is lower than the glass transition temperature (Tg) of the polyamide material, dyeing becomes non-uniform. On the other hand, if the dyeing temperature is higher than the melting point (Tx) of the polyamide material, the shape memory properties undesirably disappear.

blasts of cool air at 20° C. at an air velocity of 0.5 m/min, added with a spin finish, and then drawn at a draw ratio controlled by a spinning speed of 4500 m/min, thus producing a 70d/68f polyamide yarn having a strength of 5.2 g/d and elongation of 45%.

The produced yarn was woven or knitted to obtain a woven or knitted fabric, after which the woven or knitted fabric was subjected to steam heat treatment at 170° C. and then to dyeing at 100° C., thereby manufacturing a desired fabric. The shape memory properties of the fabrics produced in Examples 1~5 and Comparative Examples 1~2 were evaluated with the naked eye. The results are shown in Table 1 below.

TABLE 1

|  | Polyvalent Carboxylic Acid | | Polyvalent Amine | | Total Aromatic | Shape Memory | Shape Recovery |
| --- | --- | --- | --- | --- | --- | --- | --- |
|  | Compound | Mol % | Compound | Mol % | Amount (mol %) | Properties | Force |
| C. Ex. 1 | AA | 0.2 | — | — | 0 | X | X |
| C. Ex. 2 | TPA | 0.3 | HMD | 0.2 | 0.3 | Δ | X |
| Ex. 1 | IPA | 0.6 | MXD | 0.3 | 0.9 | ○ | Δ |
| Ex. 2 | t-IPA | 0.6 | HMD | 0.4 | 1.0 | ◉ | ○ |
| Ex. 3 | SiPA | 0.6 | HMD | 0.4 | 0.6 | ◉ | ◉ |
| Ex. 4 | SiPA | 1.5 | MXD | 1.0 | 2.5 | ◉ | ◉ |
| Ex. 5 | SiPA | 3.0 | MXD | 2.5 | 5.5 | ◉ | ○ |

Note:
AA: adipic acid
TPA: terephthalic acid
IPA: isophthalic acid
t-IPA: 1,3,5-tricarboxylic acid
SiPA: 5-sodium sulfoisophthalic acid
HMD: hexamethylenediamine
MXD: meta-xylenediamine The shape memory polyamide fabric produced by the method of the present invention may be used as material for various kinds of clothing. Furthermore, the polyamide fabric according to the present invention may be used as fabric for various kinds of clothing, including underwear garments, for example, body foundation garments, girdles, all-in-ones, etc., sportswear, for example, golf wear, climbing wear, etc., socks, stockings, men's suits, women's suits, etc., and may also be applied to other fields requiring shape memory properties, in addition to the clothing.

MODE FOR THE INVENTION

A better understanding of the present invention may be obtained in light of the following examples, which are set forth to illustrate, but are not to be construed to limit the present invention.

EXAMPLE

Examples 1~5 and Comparative Examples 1~2

In a mixer equipped with a stirrer, ε-caprolactam for nylon 6 and water as an initiator were placed, added with polyvalent carboxylic acid and polyvalent amine of the types and in the amounts shown in Table 1 below, and then polymerized at 250~300° C. The product thus obtained was discharged into a water bath to solidify it, after which the polymer lace was chipped, extruded, and dried, thereby obtaining copolyamide chips having a relative sulfuric acid viscosity of about 2.6 as final chip properties.

The copolyamide chips, having a water content of 0.05 parts by weight or less, were subjected to melt spinning. As such, a spinning nozzle of SUS-316 having 68 holes 0.25 mm in diameter was used, and at a spinning temperature of 265° C., the extruded threadlike polyamide was quenched with

[Evaluation of Shape Memory Properties and Shape Recovery Force]

The shape memory properties were determined by evaluating with the naked eye whether or not the original shape of the produced fabric was maintained when wrinkled, and the shape recovery force was determined by evaluating with the naked eye the degree of recovery of the wrinkled fabric to its original shape when spread flat.

◉: excellent, ○: good, Δ: fair, X: no effect

Examples 6~10 and Comparative Examples 3~4

Like Examples 1~5, in a mixer equipped with a stirrer, adipic acid and hexamethylenediamine for nylon 66 were placed, added with polyvalent carboxylic acid and polyvalent amine of the types and in the amounts shown in Table 2 below, and then polymerized at 270~350° C. Thereafter, the product thus obtained was discharged into a water bath to solidify it, after which the polymer lace was chipped, thereby obtaining copolyamide prepolymer chips having a relative sulfuric acid viscosity of about 2.6 as final chip properties.

The copolyamide prepolymer chips, having a water content of 0.05 parts by weight or less, were subjected to melt spinning. As such, a spinning nozzle of SUS-316 having 68 holes 0.25 mm in diameter was used, and at a spinning temperature of 295° C., the extruded threadlike polyamide was quenched with blasts of cool air at 20° C. at an air velocity of 0.5 m/min, added with a spin finish, and then drawn at a draw ratio controlled by a spinning speed of 4500 m/min, thus producing a 70d/68f polyamide yarn having a strength of 5.8 g/d and elongation of 43%.

The produced yarn was woven or knitted to obtain a woven or knitted fabric, after which the woven or knitted fabric was subjected to steam heat treatment at 210° C. and then to dyeing at 100° C., thereby manufacturing desired fabric. The shape memory properties of the fabrics produced in Examples 6~10 and Comparative Examples 3~4 were evaluated with the naked eye. The results are shown in Table 2 below.

TABLE 2

| | Polyvalent Carboxylic Acid | | Polyvalent Amine | | Total Aromatic | Shape Memory | Shape Recovery |
|---|---|---|---|---|---|---|---|
| | Compound | Mol % | Compound | Mol % | Amount (mol %) | Properties | Force |
| C. Ex. 3 | AA | 0.2 | — | — | 0 | X | X |
| C. Ex. 4 | TPA | 0.3 | HMD | 0.2 | 0.3 | Δ | X |
| Ex. 6 | IPA | 0.6 | MXD | 0.3 | 0.9 | ○ | Δ |
| Ex. 7 | t-IPA | 0.6 | HMD | 0.4 | 1.0 | ◎ | ○ |
| Ex. 8 | SiPA | 0.6 | HMD | 0.4 | 0.6 | ◎ | ◎ |
| Ex. 9 | SiPA | 1.5 | MXD | 1.0 | 2.5 | ◎ | ◎ |
| Ex. 10 | SiPA | 1.0 | MXD | 2.5 | 5.5 | ◎ | ○ |

With the addition of the meta-aromatic compound, nylon 6 and nylon 66 can be seen to exhibit the same shape memory properties as each other. In particular, in the case of the copolyamide prepolymer containing a sulfonic acid group, the shape memory effect was the greatest.

INDUSTRIAL APPLICABILITY

According to the present invention, the shape memory polyamide fabric has superior shape memory properties and shape recovery force, shows small shrinkage deformation, does not wrinkle after washing, and shows low wrinkling or deformation during wearing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of producing a shape memory polyamide fabric, comprising:
    adding an aromatic polyvalent carboxylic acid and an aromatic polyvalent amine when polyamide is polymerized, thereby synthesizing a copolyamide prepolymer having an aromatic component, a total amount of which ranges from 0.4 mol % to 10 mol % based on an amount of a raw material for the polyamide;
    subjecting the copolyamide prepolymer to weaving or knitting, thereby producing a woven or knitted fabric; and
    subjecting the woven or knitted fabric to a heat treatment under conditions of (1) below and then to a dyeing treatment under conditions of (2) below:

$$Tg+40° C.<Tx<Tm-20° C. \quad (1)$$

$$Tg<Td<Tx \quad (2)$$

wherein Tg is a glass transition temperature of a copolyamide prepolymer, Tx is a heat treatment temperature, Tm is a melting point of a copolyamide prepolymer, and Td is a dyeing temperature.

2. The method according to claim 1, wherein the aromatic polyvalent carboxylic acid is selected from the group consisting of terephthalic acid, isophthalic acid, benzene-1,3,5-tricarboxylic acid, 2,5- and 3,5-dicarboxybenzenesulfonic acid, 2,5- and 3,5-dicarboxyethylbenzenesulfonic acid, and 2,5- and 3,5-dicarboxypropylbenzenesulfonic acid or sulfonic acid salts of sodium, potassium or lithium thereof, 2,5- and 3,5-dimethoxycarboxylbenzenesulfonic acid, 2,5- and 3,5-dimethoxycarboxylethylbenzenesulfonic acid, and 2,5- and 3,5-dimethoxycarboxylpropylbenzenesulfonic acid or sulfonic acid salts of sodium, potassium or lithium thereof, 2,5- and 3,5-diethoxycarboxylethylbenzenesulfonic acid and 2,5- and 3,5-diethoxycarboxylpropylbenzenesulfonic acid or sulfonic acid salts of sodium, potassium or lithium thereof, 2,5- and 3,5-dipropoxycarboxylethylbenzenesulfonic acid and 2,5- and 3,5-dipropoxycarboxylpropylbenzenesulfonic acid or sulfonic acid salts of sodium, potassium or lithium thereof, and mixtures thereof.

3. The method according to claim 1, wherein the aromatic polyvalent amine is selected from a group consisting of para-phenylenediamine, meta-phenylenediamine, para-xylenediamine, meta-xylenediamine, and mixtures thereof.

* * * * *